US010565380B2

United States Patent
Polak et al.

(10) Patent No.: US 10,565,380 B2
(45) Date of Patent: Feb. 18, 2020

(54) APPARATUS AND ASSOCIATED METHOD FOR AUTHENTICATING FIRMWARE

(71) Applicant: NXP B.V.

(72) Inventors: Piotr Polak, Eindhoven (NL); Vibhu Sharma, Nijmegen (NL)

(73) Assignee: NXP B.V., Eindhoven (NL)

(*) Notice: Subject to any disclaimer, the term of this patent is extended or adjusted under 35 U.S.C. 154(b) by 205 days.

(21) Appl. No.: 15/646,299

(22) Filed: Jul. 11, 2017

(65) Prior Publication Data
US 2018/0060589 A1 Mar. 1, 2018

(30) Foreign Application Priority Data
Sep. 1, 2016 (EP) .................................... 16186899

(51) Int. Cl.
| | | |
|---|---|---|
| *G06F 8/65* | (2018.01) | |
| *H04L 9/32* | (2006.01) | |
| *G06F 21/57* | (2013.01) | |
| *G06F 9/445* | (2018.01) | |
| *H04L 29/06* | (2006.01) | |
| *H04W 12/00* | (2009.01) | |

(52) U.S. Cl.
CPC .......... *G06F 21/572* (2013.01); *G06F 21/575* (2013.01); *H04L 9/3247* (2013.01); *H04L 9/3263* (2013.01); *H04L 63/123* (2013.01); *G06F 8/65* (2013.01); *G06F 9/445* (2013.01); *G06F 21/57* (2013.01); *H04L 9/32* (2013.01); *H04L 9/3242* (2013.01); *H04W 12/0023* (2019.01)

(58) Field of Classification Search
CPC ...... G06F 21/572; G06F 21/575; G06F 21/57; G06F 8/65; G06F 9/445; H04L 63/123; H04L 9/3247; H04L 9/3263; H04L 9/32; H04L 9/3242; H04W 12/0023
See application file for complete search history.

(56) References Cited

U.S. PATENT DOCUMENTS

| | | | | |
|---|---|---|---|---|
| 7,069,452 | B1* | 6/2006 | Hind | G06F 21/572 713/1 |
| 8,650,399 | B2* | 2/2014 | Le Bihan | G06F 21/445 705/67 |
| 9,230,116 | B2* | 1/2016 | Datta | G06F 21/60 |
| 2003/0093579 | A1* | 5/2003 | Zimmer | G06F 9/4812 719/318 |
| 2003/0120909 | A1* | 6/2003 | Zimmer | G06F 9/4401 713/2 |
| 2003/0226031 | A1* | 12/2003 | Proudler | G06F 21/57 726/16 |
| 2004/0098575 | A1* | 5/2004 | Datta | G06F 9/4403 713/2 |

(Continued)

FOREIGN PATENT DOCUMENTS

WO 2015/094160 A1 6/2015

*Primary Examiner* — Nelson S. Giddins
(74) *Attorney, Agent, or Firm* — Rajeev Madnawat (57) ABSTRACT

An apparatus comprising an authentication processor configured to, based on received firmware and predetermined cryptographic authentication information, provide for cryptographic based authentication of the received firmware to control execution of the received firmware by any one of a plurality of processors. Each processor of the plurality of processors is uniquely addressable by a boot sequencer.

18 Claims, 2 Drawing Sheets

(56) References Cited

U.S. PATENT DOCUMENTS

| | | | | |
|---|---|---|---|---|
| 2004/0268141 | A1* | 12/2004 | Zimmer | G06F 21/51 726/17 |
| 2005/0021968 | A1* | 1/2005 | Zimmer | G06F 21/572 713/176 |
| 2005/0028004 | A1* | 2/2005 | Dellow | G06F 12/1441 726/26 |
| 2005/0114639 | A1* | 5/2005 | Zimmer | G06F 9/4401 712/244 |
| 2007/0130452 | A1* | 6/2007 | Muir | G06F 21/572 713/1 |
| 2007/0288739 | A1* | 12/2007 | Dale | G06F 9/4401 713/2 |
| 2008/0086652 | A1* | 4/2008 | Krieger | G06F 1/26 713/330 |
| 2009/0327684 | A1* | 12/2009 | Zimmer | G06F 21/575 713/2 |
| 2011/0138164 | A1* | 6/2011 | Cha | H04N 21/4432 713/2 |
| 2013/0227543 | A1* | 8/2013 | Chen | G06F 8/654 717/173 |
| 2014/0089651 | A1* | 3/2014 | Yao | H04L 9/3247 713/2 |
| 2014/0129818 | A1* | 5/2014 | Li | G06F 1/24 713/2 |
| 2016/0013934 | A1* | 1/2016 | Smereka | G06F 21/572 713/171 |
| 2016/0342531 | A1* | 11/2016 | Sharma | G06F 12/1408 |
| 2016/0344703 | A1* | 11/2016 | Sharma | H04L 63/0428 |
| 2016/0350549 | A1* | 12/2016 | Hampel | G06F 21/57 |
| 2017/0046513 | A1* | 2/2017 | McGovern | G06F 21/572 |
| 2017/0147356 | A1* | 5/2017 | Kotary | G06F 21/575 |
| 2017/0293484 | A1* | 10/2017 | Haase | H04L 9/0869 |
| 2018/0145991 | A1* | 5/2018 | McCauley | H04L 63/0428 |
| 2019/0007215 | A1* | 1/2019 | Hakuta | G06F 21/44 |

* cited by examiner

APPARATUS AND ASSOCIATED METHOD FOR AUTHENTICATING FIRMWARE

CROSS-REFERENCE TO RELATED APPLICATIONS

This application claims the priority under 35 U.S.C. § 119 of European Patent application no. 16186899.7, filed on Sep. 1, 2016, the contents of which are incorporated by reference herein.

The present disclosure relates to an apparatus for authentication of firmware on behalf of a plurality of processors.

A processor may perform its function based on firmware comprising computer program code for execution by the processor to perform its intended function. The firmware may be updated remotely.

According to a first aspect of the present disclosure there is provided an apparatus comprising:
- a firmware authentication element configured to, based on received firmware and predetermined cryptographic authentication information, provide for cryptographic based authentication of the received firmware to control execution of the received firmware by any one of a plurality of processors.

In one or more embodiments, the firmware authentication element is configured to authenticate, by way of verification of cryptographic signatures of the received firmware, the authenticity of the received firmware on behalf of the plurality of processors thereby obviating the need for each processor to include a means for firmware authentication. In one or more embodiments, the firmware authentication element may control execution of the received firmware by way of one or more of: i) signalling to any one of the plurality of processors or the absence thereof to cause the execution of the received firmware or prevent the execution of the received firmware by said any one of the plurality of processors; and ii) providing or withholding said received firmware as a firmware update to any one of the plurality of processors.

In one or more embodiments, the plurality of processors comprises at least a first processor and a second processor of the apparatus, the first processor comprising a first microprocessor associated with a first memory for storing first firmware for execution by the first microprocessor, and the second processor comprising a second microprocessor associated with a second memory for storing second firmware, different to the first firmware, for execution by the second microprocessor; and the firmware authentication element thereby provides for authentication of the received firmware on behalf of at least the first processor and the second processor.

In one or more embodiments, the received firmware comprises firmware stored in any one of the first memory and second memory and provided to the firmware authentication element.

In one or more embodiments, the received firmware comprises one or more of;
  i) firmware received from a firmware source remote from the apparatus for updating of firmware associated with any one of the plurality of processors;
  ii) firmware received from any one of the plurality of processors for execution by said any one of the plurality of processors.

In one or more embodiments, said cryptographic based authentication comprises one or more of:
  i) public/private key authentication of received firmware signed by a private key, the predetermined cryptographic authentication information comprising a counterpart public key to said private key;
  ii) symmetric key authentication of received firmware signed by a cryptographic key, the cryptographic key comprising said predetermined cryptographic authentication information.

In one or more embodiments, the apparatus is configured to receive a firmware update, comprising the received firmware, from a remote firmware source for updating of the firmware associated with any one of the plurality of processors, the firmware update including a cryptographic signature which is authenticated by the firmware authentication element using the predetermined cryptographic authentication information.

In one or more embodiments, the firmware authentication element is configured to further verify whether or not the firmware update comprises a later version of the firmware currently provided for execution by the any one of the plurality of processors. The updating of the firmware may be provided only if the firmware update comprises a later version.

In one or more embodiments, the apparatus is configured to, on successful authentication of the firmware update, forward the firmware update to a processor of the plurality of processors which is identified as an intended recipient of the firmware update.

Accordingly, in one or more embodiments, the apparatus may be configured to, on successful authentication, provide the firmware update for storage in the first memory or second memory as appropriate associated with the any one of the plurality of processors.

In one or more embodiments, the processor of the plurality of processors which is identified as the intended recipient of the firmware update firmware update is identified by way of one or more of i) identification information of the firmware update that identifies the processor for which the update is intended and ii) a characteristic of the firmware update and predetermined processor characteristic information of the apparatus.

In one or more embodiments, the apparatus is configured to, on successful authentication of the firmware update, store cryptographic information of the firmware update for subsequent authentication of the firmware update prior to execution of the firmware update by the any one of the plurality of processors.

In one or more embodiments, the firmware authentication element is configured to, on failure of authentication of the firmware update, withhold the forwarding of the firmware update to any one of the plurality of processors.

In one or more embodiments, the apparatus is configured to receive processor firmware, as the received firmware, from any one of the plurality of processors prior to execution of said processor firmware by said any one of the plurality of processors, the firmware authentication element configured to, on successful authentication of the processor firmware, provide signalling to said any one of the plurality of processors to cause the execution of the authenticated, processor firmware by said any one of the plurality of processors.

In one or more embodiments, the firmware authentication element is configured to, on failure of the authentication of the processor firmware, provide or withhold signalling to the processor to prevent the execution of the processor firmware by said any one of the plurality of processors.

In one or more embodiments, the apparatus includes a bus, providing an addressable communication channel, between the firmware authentication element and the at least first and second processors for provision of signalling to control the execution of the received firmware by any one of the first and second of processor.

In one or more embodiments, the apparatus includes a communication element configured to provide an encrypted communication channel upon which to receive the received firmware.

In one or more embodiments, the encrypted communication channel may be provided over the bus and/or to a remote firmware source over a network.

In one or more embodiments, the firmware authentication element is configured to provide for calculation of a hash of the received firmware and the cryptographic based authentication of the received firmware is based on said hash.

According to a second aspect of the present disclosure there is provided a method comprising, based on received firmware and predetermined cryptographic authentication information, providing for cryptographic based authentication of the received firmware to control execution of the received firmware by any one of a plurality of processors.

According to a third aspect of the present disclosure there is provided an electronic device including the apparatus of the first aspect.

In one or more embodiments the electronic device comprises an electronic device for controlling the functionality of an automobile, each processor configured to perform a defined function for the automobile. In one or more embodiments, the electronic device comprises an Internet of Things (IoT) Gateway which may comprises two or more of an application processor and a plurality of peripheral processors providing each of Bluetooth®, ZigBee and/or WiFi functionality, etc. It will be appreciated that the electronic device may comprises any multi-processor arrangement.

According to a fourth aspect of the present disclosure there is provided a computer program or a computer readable medium comprising computer program code which, when provided to a memory associated with a processor and executed by said processor is configured to, based on received firmware and predetermined cryptographic authentication information, providing for cryptographic based authentication of the received firmware to control execution of the received firmware by any one of a plurality of processors.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

It may be desirable to allow many devices to communicate. As an example, smart environments (smart cities, buildings, homes, cars, etc.) may be achieved by enabling devices to communicate with remote devices such as one or more other connected devices and/or one or more cloud-based computing platforms (i.e. remote computing platforms accessed by the device via a communication network, such as the Internet). Accordingly, connected devices may be provided with communication functionality for communication with remote devices. Devices that were traditionally not provided with communication functionality may become "always-connected" to Internet. Thus, devices that may have operated using a simple single processor devices may now require a multiprocessor arrangement, such as an arrangement incorporating a number of connectivity processors supporting multiple communication protocol stacks.

The transition to smart environments may impose a challenge for "connected device" design. In one or more examples, a concern that has to be addressed for connected devices is security. Once connected to a communication network, a connected device may become exposed to attacks launched from the Internet by a remotely located attacker.

In one or more situations, a vulnerability typically exploited by a hacker intent on taking control of a connected device is the mechanism of an over-the-air firmware update, or, more generally, a remotely-sourced firmware update. Firmware may comprise software executed by the connected device or "processor" that provides the functionality of the connected device. It may be convenient for connected device manufacturers and/or users if that firmware can be updated from a remote source using the communication functionality. An over-the-air firmware update may provide updated firmware that is delivered to the device via its communication functionality. It will be appreciated that the communication functionality may comprise wireless or wired communication functionality and while the term "over-the-air" may be primarily intended to relate to wireless communication functionality, this disclosure may be equally applicable to remotely-sourced firmware updates delivered by any communication medium, wired or wireless.

By exploiting the update mechanism an attacker may be able to trick a device into downloading a compromised firmware image including malware or a back door. Also, once downloaded, firmware may also be remotely changed by an attacker with the intention of exploiting a device or network to which the device is part. Therefore, in one or more examples, it may be desirable to provide for a mechanism for booting of an electronic device with verification of the authenticity of the firmware used to provide said booting, also known as "secure boot". In one or more examples, it may be desirable to provide for a mechanism for receiving remotely-sourced firmware updates for an electronic device with verification of the authenticity of the firmware update, also known as "authenticated firmware updates".

In one or more examples, it may be costly to implement such systems, especially for systems incorporating multiple processors and/or those requiring multistage firmware upgrade procedures.

Figure 1:
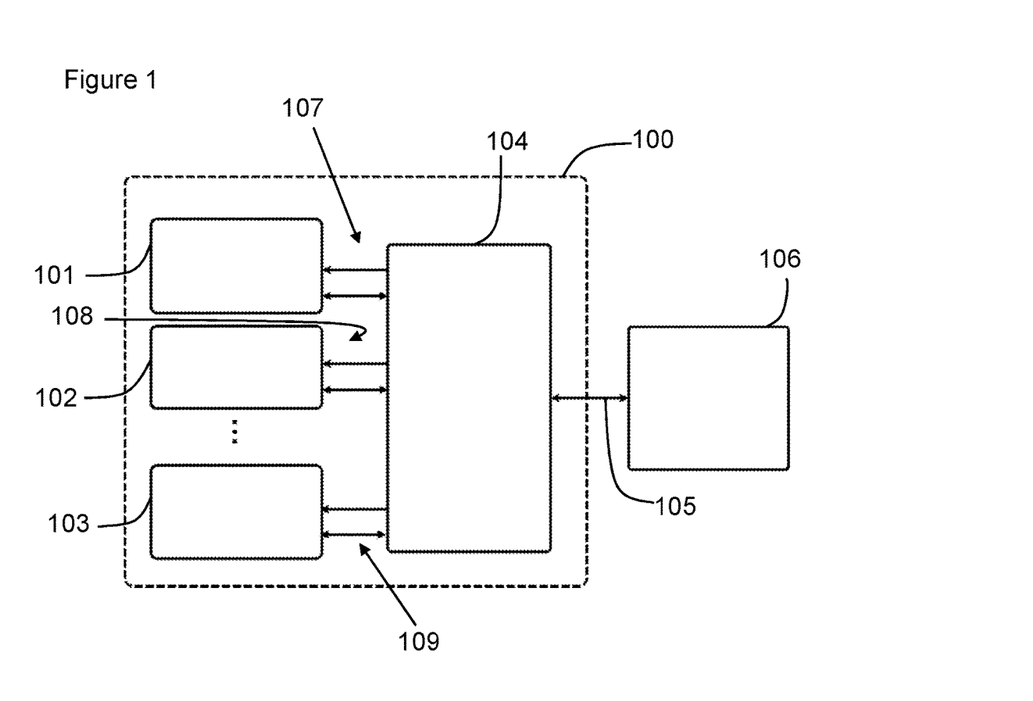
FIG. 1 shows an example embodiment of an apparatus configured to provide firmware verification for a plurality of microprocessors.

FIG. 1 shows an apparatus 100 configured to provide for the authentication of firmware for a plurality of processors comprising first 101, second 102 and third 103 processors. The processors may comprise microprocessors, such as general purpose microprocessors. In this example, three processors are shown but it will be appreciated that in other examples a different plurality of processors may be provided. The apparatus 100 may be integrated with the plurality of processors 101, 102, 103 to form an electronic device. Thus, the apparatus 100 may be embodied on the same PCB or integrated circuit chip as the processors 101, 102, 103 or the processors and apparatus 100 may be distributed over several integrated circuit chips, which may or may not be in the same package. In one or more embodiments, the processors 101, 102, 103 may be separate from the apparatus 100 and the apparatus 100 includes a communication link between it and the processors for the authentication of the firmware for the processors 101, 102, 103.

Each of the processors 101, 102, 103 may be configured to perform a particular function by way of, at least in part, firmware associated therewith. Accordingly, the firmware may provide computer program code for execution by the associated processor to perform its designated function. Thus, each processor 101, 102, 103 may include or have access to an associated memory or a shared memory (not shown in FIG. 1) for access by one or more of the plurality of processors 101, 102, 103 in which the firmware is stored.

The apparatus 100 comprises a firmware authentication element 104 for verifying the authenticity of firmware on behalf of and for execution by the processors 101, 102, 103.

The apparatus 100 may include or, more generally, the apparatus 100 may be associated with a communication interface represented by arrow 105. The communication interface 105 provides for communication between the apparatus 100 and one or more remote firmware sources 106. The communication interface 105 may provide for communication with the remote firmware source 106, which may be via a local or wide area network or the Internet. The communication interface 106 may comprise a CAN bus for providing at least part of a communication path to the remote firmware source 106.

The remote firmware source 106 may comprise a manufacturer or publisher of firmware software authorised by the manufacturer of one or more of the plurality of processors 101, 102, 103. It may however, in some circumstances, comprise a malicious agent attempting to provide malicious firmware to any one of the plurality of processors 101, 102, 103, which may be prevented by the firmware authentication element 104. The communication element 105 may provide for data transfer from and/or to the processors 101, 102, 103 in the performance of their designated function.

In one or more examples, the apparatus 100 includes a communication channel for each of the processors 101, 102, 103 to communicate with the firmware authentication element 106. The apparatus 100 may be configured to communicate with the first processor 101 by way of first communication channel 107. The apparatus 100 may be configured to communicate with the second processor 102 by way of second communication channel 108. The apparatus 100 may be configured to communicate with the third processor 103 by way of the third communication channel 109. In one or more examples, each communication channel may provide for the exchange of signalling, such as signalling representative of data representing at least part of the firmware, between the respective processor and the apparatus 100. In one or more examples, each communication channel may provide for the exchange of signalling for control of each processor 101, 102, 103 by the apparatus 100. In general, the processors 101, 102, 103 may be individually addressable by the apparatus 100. The communication channels 107, 108, 109 may comprise a Serial Peripheral Interface (SPI) or I²C based interface, although it will be appreciated that any other type of interface or bus may be used.

The apparatus 100 may be configured to act on behalf of the plurality of processors for the authentication of the firmware of each of the processors during one or more of; booting of one or more of the processors 101, 102, 103 and updating of the firmware of one or more of the plurality of processors 101, 102, 103.

The apparatus 100 may form part of an electronic device which may comprise any multiprocessor system, such as: for controlling the functionality of an automobile, each processor configured to perform a defined function for the automobile such as sensing or controlling; a connectivity gateway such as for an Internet of Things (IoT) Gateway which may comprises two or more of an application processor and a plurality of peripheral processors providing each of Bluetooth®, ZigBee and/or WiFi functionality, or control and management functions.

The apparatus 100, or more specifically the firmware authentication element 104, may include a memory (not shown in FIG. 1) for storing a cryptographic signature for the firmware of each of the processors. The signatures may be used by the apparatus 100 for authentication of the firmware of the processors. The memory may comprise a secure memory, such as a memory that uses memory protection to control access to data stored in the memory. The apparatus 100, or more specifically the firmware authentication element 104, may include a processor (not shown in FIG. 1) configured to perform cryptographic processing for authentication of firmware based on public-key cryptography (e.g. RSA or ECC key based), or symmetric key (e.g. AES based) or other authentication process.

Thus, the apparatus 100 may be configured to store cryptographic assets, such as keys and signatures, on behalf of the plurality of processors 101, 102, 103 and therefore, the circuitry required to handle such cryptographic assets may only be required for apparatus 100 and not each of the processors 101, 102, 103 which may simplify a trust provisioning process for authentication of firmware.

Figure 2:
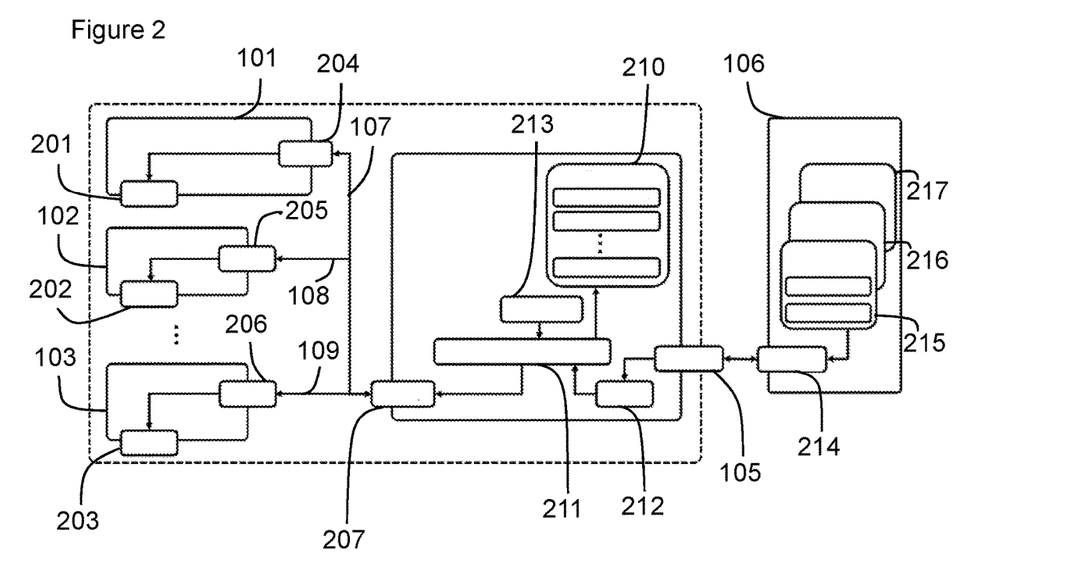
FIG. 2 shows a more detailed schematic of the apparatus of FIG. 1, illustrating verification of a firmware update for one of the plurality of microprocessors.

FIG. 2 shows the apparatus of FIG. 1 in more detail showing the component parts of the firmware authentication element 104 and the processors 101, 102, 103 that may be used to apply a firmware update to one or more of the processors from a remote firmware source 106. In this example the apparatus 100 may be implemented in an automotive system involving a multiprocessor electronic control unit (ECU).

Each of the processors 101, 102, 103 include a firmware store 201, 202, 203 for storing the firmware that is executed by the processor to perform its intended function. The firmware store may comprise non-volatile memory. The processors 101, 102, 103 also each includes a communication interface 204, 205, 206 for providing access to the respective communication channels 107, 108 and 109. The communication channels 107, 108 and 109 are shown, in this example, as part of a bus. It will be appreciated that other arrangements of the communication channels 107, 108, 109 may be used. The apparatus 100 includes a communication interface 207 for providing access to the bus and providing for individual communication with each of the processors 101, 102, 103. In this example, the communication interface 207 comprises an SPI bus.

The apparatus 100 includes the memory 210 for storage of cryptographic assets for use during updating of the firmware of one or more of the plurality of processors 101, 102, 103. The apparatus 100 may include an authentication processor 211, which may be a processor dedicated to cryptographic based authentication, or a general purpose processor. The authentication processor 211 may be configured to, based on a locally stored public key 213 and digitally signed firmware image data received from the remote firmware source, provide for authentication of said firmware image data to verify that said firmware was sent by a trusted remote firmware source associated with one or more of the signatures and, based on successful authentication, provide for onward transmission of the firmware image data to the processor of the plurality of processors for which it is intended. If the authentication is not successful, then the firmware image data may not be transferred to the processor of the plurality of processors for which it is intended. The public key may be provided to the firmware authentication element 104 on manufacture or during a trust provisioning step. Accordingly, the firmware update would be signed using a private key of the firmware source 106, which is a counterpart to the public key 213 stored by the firmware authentication element 104.

The communication interface 105, in this example, comprises a CAN bus interface. The corresponding communication interface of the remote firmware source 106 also comprises a CAN bus interface 214.

The remote firmware source 106 may comprise a repository of firmware image data 215, 216, 217 for use in updating the firmware of the plurality of processors 101, 102, 103. The firmware image data 215, 216, 217 for each processor may be divided into a plurality of blocks of data and each block may include a digital signature. The signature may be applied using a private key belonging to the trusted firmware supplier for which the apparatus 100 has the corresponding public key in block 213. In other examples, the firmware image data may not be divided into blocks and may include a signature for the whole firmware image or hash thereof.

The apparatus 100 may include a hashing block 212 for calculating a hash of data received from the remote firmware source 106 before providing said hash to the authentication processor 211. The hash determined by the hashing block 212 may be a Secure Hash Algorithm hash. Thus, the authentication of the received firmware may be based on a digital signature of a firmware image, digital signatures of firmware blocks, digital signatures of a hash of the image or digital signatures of hashes of the blocks.

In use, the apparatus 100 acts to authenticate a firmware update for each of the plurality of processors 101, 102, 103 each time a new firmware update is received from the remote firmware source 106 for a particular processor.

As mentioned above, the firmware being transmitted may be divided in blocks that are evaluated separately by the authentication processor 211. As each block may be provided with a cryptographic signature, the processor 211 may be configured to authenticate the component blocks of the firmware image data as they are received over the communication channel between the apparatus 100 and remote firmware source, i.e. "on-the fly" verification. Each block, signed using a private key of the firmware source, may be authenticated using the counterpart public key 213 by the authentication processor 211.

The authentication processor 211 may be configured such that the digital signature of each block will be verified against the trusted firmware supplier's key (typically a public key from block 213) and sent to the appropriate microprocessor 101, 102, 103 when verified. The apparatus 100 may be configured to identify the processor 101, 102, 103 for which the firmware is intended by one or more of: analysis of the firmware image data or blocks thereof; identification of the remote firmware source and information sent by the remote firmware source identifying the processor.

The apparatus 100 may act as an SPI master when accessing the SPI bus and is able to select the processor 101, 102, 103 that the currently verified block is destined for. The SPI interface is thus used to transport verified firmware image data blocks to the corresponding processor 101, 102, 103. The firmware derived from the firmware image data may be store in the firmware store 201, 202, 203 of the particular processor 101, 102, 103.

Each of the processors 101, 102, 103 may be responsible for performing the operations necessary to begin execution of the updated firmware delivered thereto. For example, the processors 101, 102, 103 may be configured to perform the firmware image switch on the next processor reboot.

In one or more examples, the authenticated firmware image data or blocks thereof may be sent to all the processors 101, 102, 103 and the processors themselves may be configured to determine whether the firmware image data is intended for them.

The apparatus 100 may be configured to, on successful authentication of the firmware image data, store information representative of the firmware image in the memory to provide for future authentication of the firmware prior to execution by the processor. The information stored may use a cryptographic key of the apparatus 100. Accordingly, in one or more examples, the firmware authentication element may apply a digital signature using a cryptographic key to the firmware image data or blocks thereof and store the digitally signed data (or hashes thereof) in the memory 210.

In one or more examples, the apparatus 100 may be configured to store a version identifier of the firmware image data in the memory 210. The version identifier may be used by the firmware authentication element 104 to verify that a subsequent firmware update received over the communication is an update (i.e. a later version).

In the above example, public/private keys are used to verify the authenticity of the firmware update received from the remote firmware source 106, however, it will be appreciated that other authentication mechanisms may be used such as symmetric key based schemes. For example, for a symmetric key based scheme the apparatus may use AES-CCM (authenticated encryption) or SHA based HMAC.

Figure 3:
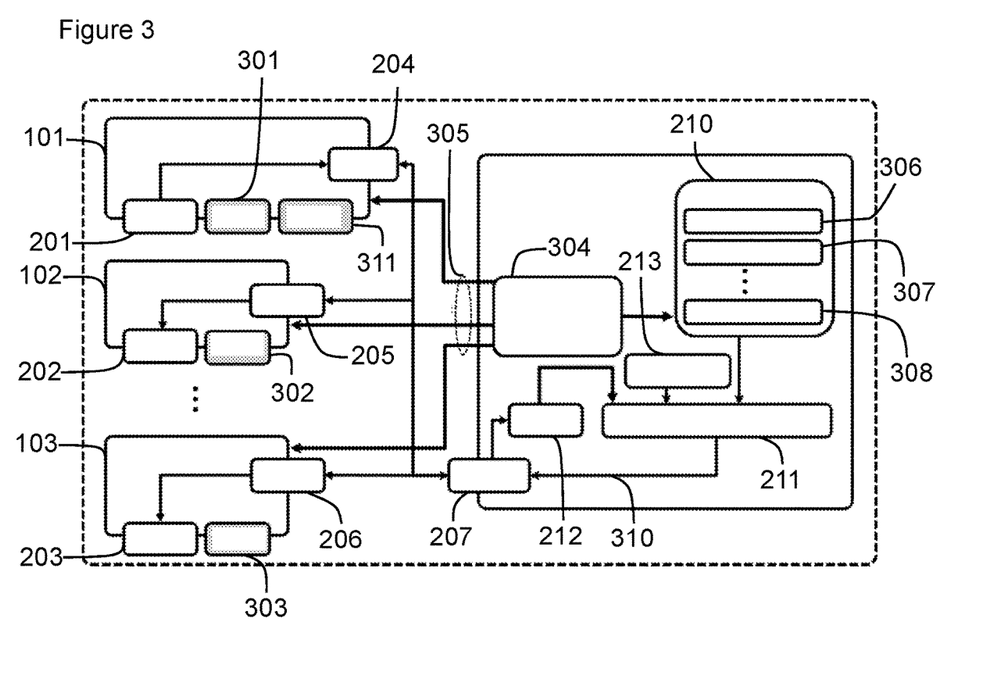
FIG. 3 shows an example embodiment of the apparatus configured to provide verification of firmware for a plurality of microprocessors for booting.

FIG. 3 shows the functional components of the apparatus 100 and the processors 101, 102, 103 for implementation of secure or authenticated booting, in which the firmware about to be executed by at least one of the plurality of processors is only executed if verified as authentic by the apparatus 100.

FIG. 3 shows, as in FIG. 2, that each of the processors 101, 102, 103 includes the firmware store 201, 202, 203 for storing the firmware that is executed by the processor to perform its intended function. The firmware store may comprise non-volatile memory. Each of the processors further includes ROM memory 301, 302 and 303. The ROM memory may be configured to include instructions to send the firmware, such as in blocks, or data representative of the firmware for authentication by the apparatus 100 at each boot, i.e. each time the firmware is initially loaded, such as after a reset or power on after a power off period.

As in FIG. 2, each of the processors includes part of the communication interface 204, 205, 206 for communication with the apparatus 100 with its associated communication interface 207.

The apparatus 100 includes a boot sequencer 304, which is configured to apply reset signalling 305 to a desired processor 201, 202, 203. Accordingly, each processor 101, 102, 103 is uniquely addressable by the boot sequencer, such that each processor may be reset in turn. Similar to the previous embodiment of FIG. 2, the apparatus 100 includes an authentication processor 207 which provides for authentication of data using digital signatures stored in memory 210. The digital signatures in memory 210 may be stored from a previous firmware update authenticated by the apparatus 100 or may be pre-loaded, such as at manufacture or initial set-up. Accordingly, the memory 210 may include a digital signature 306, 307, 308 for each of the firmware of the respective processors 101, 102, 103. Apparatus 100 also includes the hashing block 212. However, in this example it is configured to provide a hash of the firmware image data or blocks thereof received from each of the processors 101, 102, 103 to the authentication processor 211. The hashing block 212 may be configured to apply a Secure Hash Algorithm hash. Further, the authentication processor 211 may be configured to send successful-authentication signalling 310 indicative of the firmware stored at a particular processor being verified as authentic by the apparatus 100 such that booting or execution of the firmware, by the particular processor, can begin.

In use, the checking of the authenticity of firmware of one or all of the processors is performed each time any one or all of the processors are reset or powered on after a period powered off. The apparatus 100 may be configured such that the boot sequencer 304 selects each of the processors 101, 102, 103 in turn for checking the authenticity of the firmware. Thus, in effect, the boot sequencer 304 may be configured to wake each processor 101, 102, 13 in turn. For example, the boot sequencer may select the second processor 102 by way of reset signalling and cause it to send its firmware to the apparatus 100. The ROM code 302 upon execution causes the firmware to be sent over the interface 205, 207.

If, on firmware update or manufacture, the firmware authentication element 104 stores digital signatures of blocks of the firmware in the memory 210, it may be convenient for the processors to be configured to send equivalently structured blocks to the firmware authentication element 104 for authentication.

In one or more examples, the processors are configured to send the firmware as a plurality of blocks for receipt by the apparatus 100. On receipt of each block, the apparatus 100 is configured to calculate a hash of the block by hashing block 212 and send the hash to the authentication processor 211.

The authentication processor 211 then verifies whether the block sent by the processor is authentic based on the digital signatures in the memory 210. This may be achieved by comparing the digital signature(s) in the memory 210 (signed by a key or counterpart key known to the authentication processor 211) with a calculated digital signature of the firmware or block thereof received from the processor 102 of the plurality of processors. If the digital signature of the stored data of memory 210 matches with the currently calculated signature, the firmware or block thereof may be deemed authentic. In this example, as each block is verified as authentic by the authentication processor 211, signalling is provided to the respective processor 202. The ROM code 302 of the processor 102 may be configured to execute said firmware only on receipt of confirmation that each and every block is authenticated. If one or more of the blocks is not authenticated then the processor 101, 102, 103 to which the firmware belongs may be one or more of; deactivated or updated with authenticated firmware. The boot sequencer 304 may then provide for selection of another or the next processor 101, 103, and a similar procedure may be followed.

In one or more examples, signalling that the firmware blocks are authenticated may be sent by the apparatus 210 to the respective processor 101, 102, 103 only once each and every firmware block is authenticated. In one or more examples, the whole firmware image may be sent and authenticated by the apparatus 100 rather than blocks or hashes thereof.

In one or more examples, for instance where the firmware image data is above a threshold size (although this need not be a condition), the processor 101, 102, 103 having the firmware may calculate a hash of the firmware or blocks and then send the hash rather than the firmware block for authentication of the firmware by the authentication processor 211. In such an example, the hashing block 212 may be bypassed. The first processor 101 is shown with a hashing block 311 (as an example of such an implementation) for calculation of a hash of the firmware blocks. The sending of hashes of the firmware blocks rather than the firmware data itself may be more efficiently sent over the communication interface 204, 205, 206, 207.

For example, the MCU (1) depicted in the FIG. 3 calculates SHA hash over its Firmware blocks and sends the resulting hashes to the firmware authentication element 104 for verification. In one or more examples, a single hash over the complete firmware image is sent to the firmware authentication element 104. It will be appreciated that the apparatus 100 has, stored in memory 210, a corresponding digital signature that can be used to compare against and verify the authenticity of firmware image signature.

It will be appreciated that the functionality provided by the ROM code 301, 302, 303 (and the optional hashing function 311) to correctly send the firmware to the apparatus 100 should be trusted as well as to continue the boot process only if the successful authentication signalling sent by the apparatus 100 is received. The communication channels 107, 108, 109 between a processor and the apparatus 100 may be encrypted and/or the communication between the processors 101, 102, 103 and apparatus 100 authenticated itself. The communication channel 105 between the apparatus 100 and the remote firmware source 106 may also be encrypted.

The apparatus 100 may be configured to send a notification to the remote firmware source 106 upon the occurrence of a failed authentication attempt and/or provide a status report on request. The status report may comprise an attestation report digitally signed with an encryption key unique to the apparatus 100.

Figure 4:
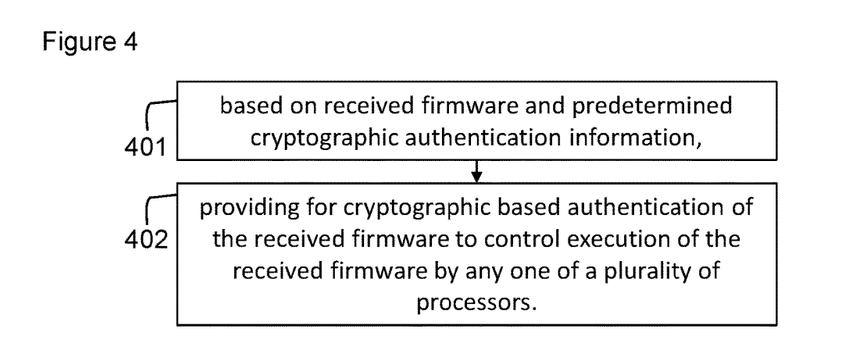
FIG. 4 shows an example method.

FIG. 4 shows a flowchart illustrating a method of based on received firmware and predetermined cryptographic authentication information 401, providing for cryptographic based authentication of the received firmware to control execution of the received firmware by any one of a plurality of processors 402.

While the apparatus 100, in the above examples, is shown as a separate device able to communicate with the processors, in one or more examples, it may be integrated into one or more of the processors 101, 102, 103 and configured to act on behalf of a greater number of processors than with which it is integrated for the authentication of the firmware of each of the processors.

The method may be embodied as (non-transient) computer program code or a computer program product for execution by a processor associated with memory for performance of the method. The computer program product may comprise a CD, DVD, flash drive, a download comprising the computer program code.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising:
a boot sequencer circuit configured to apply reset signaling to uniquely address each processor of a plurality of processors, select one of the plurality of processors, and cause the selected processor to send firmware to the apparatus, wherein each processor is selected in a specific turn order;
an authentication processor configured to, based on both the firmware, received from the selected processor as caused by the boot sequencer circuit, and predetermined cryptographic authentication information, provide for cryptographic based authentication of the received firmware to control execution of the received firmware by the selected processor of the plurality of processors.

2. The apparatus of claim 1, wherein the plurality of processors comprises at least a first processor and a second processor of the apparatus, the first processor comprising a first microprocessor associated with a first memory configured to store first firmware for execution by the first microprocessor, the second processor comprising a second microprocessor associated with a second memory configured to store second firmware, different from the first firmware, for execution by the second microprocessor; and the authentication processor being configured to provide for authentication of the received firmware on behalf of at least the first processor and the second processor.

3. The apparatus of claim 1, wherein the received firmware comprises one or more of:
i) firmware received from a firmware source remote from the apparatus for updating of firmware associated with any one of the plurality of processors; and
ii) firmware received from any one of the plurality of processors for execution by said any one of the plurality of processors.

4. The apparatus of claim 1, wherein said cryptographic based authentication comprises one or more of:
public/private key authentication of received firmware signed by a private key, the predetermined cryptographic authentication information comprising a counterpart public key to said private key;
symmetric key authentication of received firmware signed by a cryptographic key, the cryptographic key comprising said predetermined cryptographic authentication information.

5. The apparatus of claim 1, wherein the apparatus is configured to receive a firmware update, comprising the received firmware, from a remote firmware source for updating of the firmware associated with any one of the plurality of processors, the firmware update including a cryptographic signature which is authenticated by the authentication processor using the predetermined cryptographic authentication information.

6. The apparatus of claim 5, wherein the apparatus is configured to, on successful authentication of the firmware update, forward the firmware update to a processor of the plurality of processors which is identified as an intended recipient of the firmware update.

7. The apparatus of claim 5, wherein the apparatus is configured to, on successful authentication of the firmware update, store cryptographic information of the firmware update for subsequent authentication of the firmware update prior to execution of the firmware update by the any one of the plurality of processors.

8. The apparatus of claim 5, wherein the authentication processor is configured to, on failure of authentication of the firmware update, withhold forwarding of the firmware update to any one of the plurality of processors.

9. The apparatus of claim 1, wherein the apparatus is configured to receive processor firmware, as the received firmware, from any one of the plurality of processors prior to execution of said processor firmware by said any one of the plurality of processors, and the authentication processor is configured to, on successful authentication of the processor firmware, provide signaling to said any one of the plurality of processors to cause the execution of the authenticated processor firmware by said any one of the plurality of processors.

10. The apparatus of claim 9, wherein the authentication processor is configured to, on failure of the authentication of the processor firmware, provide or withhold signaling to the selected processor to prevent the execution of the processor firmware by the selected processor.

11. The apparatus of claim 2, wherein the apparatus includes a bus configured to provide an addressable communication channel between the authentication processor and at least the first processor and the second processor for provision of signaling to control the execution of the received firmware by at least the first processor and the second processor.

12. The apparatus of claim 1, wherein the apparatus further comprises:
 a communication interface configured to provide an encrypted communication channel upon which to receive the received firmware.

13. The apparatus of claim 1, wherein the authentication processor is configured to provide for calculation of a hash of the received firmware and the cryptographic based authentication of the received firmware is based on said hash.

14. A method comprising:
 selecting, by a boot sequencer circuit configured to apply reset signaling to uniquely address each processor of a plurality of processors, one of the plurality of processors, wherein each processor is selected in a specific turn order;
 causing, by the boot processor circuit, the selected processor to send firmware to an apparatus;
 receiving, by an authentication processor, the firmware, received from the selected processor as caused by the boot sequencer circuit, and predetermined cryptographic authentication information; and
 providing, by the authentication processor, cryptographic based authentication of the received firmware to control execution of the received firmware by the selected processor of the plurality of processors.

15. An electronic device including the apparatus of claim 1.

16. The apparatus of claim 1, wherein the apparatus is implemented in an automotive system involving a multiprocessor electronic control unit.

17. The apparatus of claim 12, wherein the communication interface comprises a Serial Peripheral Interface (SPI) bus.

18. The apparatus of claim 12, wherein the communication interface comprises a Controller Area Network (CAN) bus interface.

* * * * *